United States Patent [19]

de Cremiers

[11] 3,883,729

[45] May 13, 1975

[54] TIME MULTIPLEX FRAME CORRELATION DEVICE

[75] Inventor: Francois Augier de Cremiers, Paris, France

[73] Assignee: Compagnie Industrielle des Telecommunications Cit-Alcatel, France

[22] Filed: Feb. 12, 1974

[21] Appl. No.: 441,738

[30] Foreign Application Priority Data

Feb. 12, 1973 France .............................. 73.04906

[52] U.S. Cl. ......... 235/181; 178/69.5 R; 179/15 BS

[51] Int. Cl. ............................................ G06f 15/34

[58] Field of Search ............... 235/181; 178/69.5 R; 179/15 BS; 325/38 R; 340/146.1 D

[56] References Cited

UNITED STATES PATENTS

| | | | |
|---|---|---|---|
| 3,518,415 | 6/1970 | Gutleber | 235/181 |
| 3,670,151 | 6/1972 | Lindsay et al. | 235/181 |
| 3,701,894 | 10/1972 | Low et al. | 235/181 |
| 3,792,245 | 2/1974 | Hocker et al. | 235/181 |

*Primary Examiner*—Joseph F. Ruggiero
*Attorney, Agent, or Firm*—Craig & Antonelli

[57] ABSTRACT

Device for the automatic search for the characteristic elements of a time multiplexing binary frame comprising a logic circuit equipment which, on receiving such a frame whose parameters are unknown, searches automatically, on the basis of a correlation between the incident signal and the same signal delayed, the number of bits N and makes it possible to determine by simple and rapid manipulations which may be automatic, a synchronization word which exists in principle in any time multiplexing frame.

10 Claims, 12 Drawing Figures

TIME MULTIPLEX FRAME CORRELATION DEVICE

The invention comes within the branch of multiple channel transmission systems in which each channel is transmitted in the form of samples taken at instants occupying a fixed place in a period of time, of frame, which may comprise a predetermined number of bits N, which is repeated indefinitely with the same time allowance of the placing of the channels, for example, a PCM frame. It concerns a logic circuit equipment which, on receiving such a frame whose parameters are unknown, searches automatically, on the basis of a correlation between the incident signal and the same signal which has been delayed, the number N of bits and makes it possible to determine, by simple and rapid maneuvers, which may be made automatic, a synchronizing word which exists in principle in any frame for the multiplexing of time. Such an equipment has its place in a receiver station capable of proceeding with the improvised receiving of a signal whose structure is not known previously.

A transmission by PCM frame comprises two signals, a data signal and a rhythm signal which supplies, at the receiving unit, the clock pulses necessary for the decoding of the data.

The method used consists in delaying the PCM signal by a certain number n of clock instants and in comparing the direct signal with the delayed signal. That comparison supplies the autocorrelation function $\phi(n)$ of the signal. If there exists in the frame of N bits a word having a fixed place which is repeated identically to itself (synchronizing word, or possibly a word designating a free channel), that auto-correlation function assumes the value 1 on that word where $n$=N. For values of n which increase each time by a unit starting from an original value chosen at random, of its own accord, the equipment searches whether $\phi(n)=1$ is obtained for a certain word having a length of s bits (s being fixed previously). If the above equality is obtained for a certain value of $n$, there is a high probability that $n$ is equal to N. The exactitude of the relation $n$=N is confirmed by a repetition over a certain number of frames fixed in advance.

The device, therefore, comprises on the one hand the correlation element defined above and, on the other hand, a circuit assembly ensuring automatically the adjusting of the variable parameter n in relation to the unknown value N, in increasing values of $n$, starting from an original value of n chosen at random. It comprises also control and display elements making it possible to observe the arrival at the adjustment $n$=N and supplying the constitution of the repetitive word.

The device will be described in detail taking as an example an embodiment with reference to the accompanying drawings, among which:

FIG. 1 is a diagram of a correlation element;

FIGS. 2*a* and 2*b* are graphs showing the law of probability of a first signal;

FIGS. 3*a* and 3*b* are graphs showing the law of probability of a second signal;

Figure 6A:
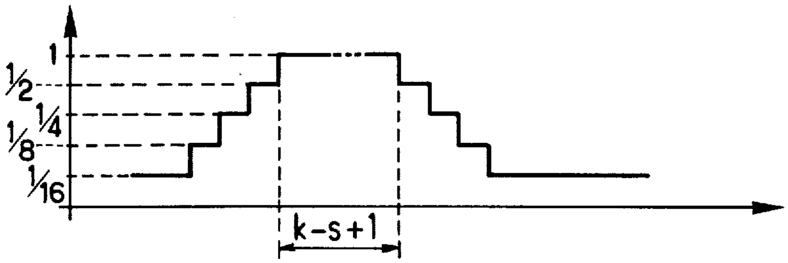
Figure 6B:
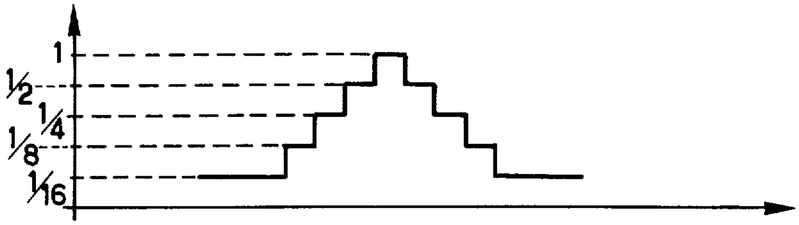
Figure 6C:
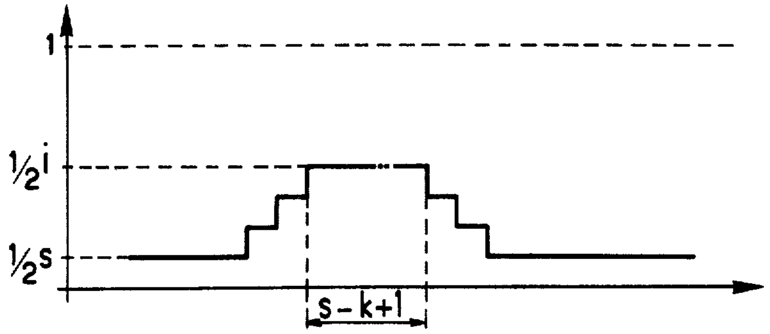
Figure 7:
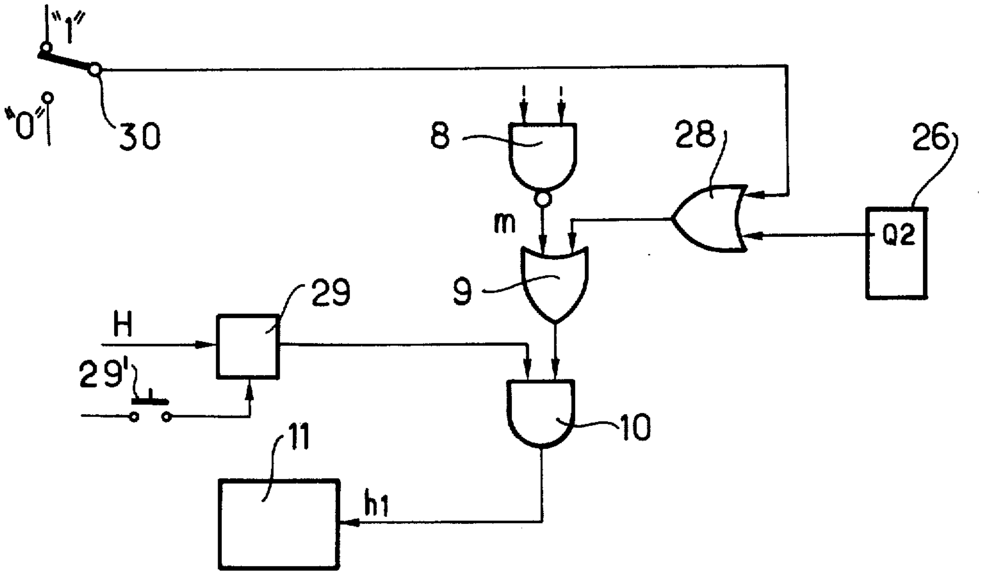

FIGS. 6*a*, 6*b*, 6*c* show further aspects of the law of probability of the said second signal;

FIG. 7 describes an extra manual control means; and

Figure 8:
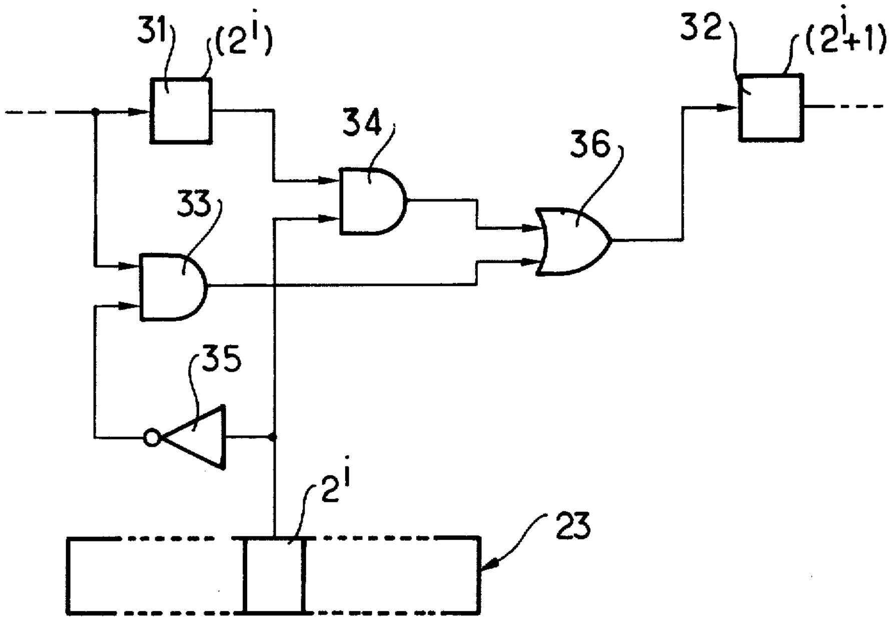

FIG. 8 describes a means for making the number n of clock delay instants vary automatically.

Figure 1:
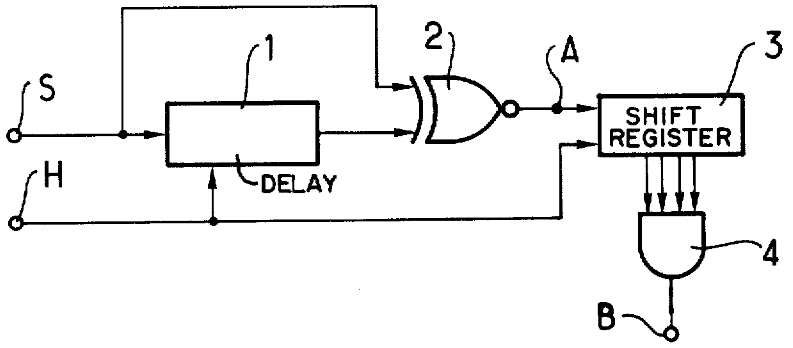

In FIG. 1 the PCM signal S arrives directly on a first input of a comparison circuit 2, of the $\overline{\text{EXCLUSIVE OR}}$ type, and, on the other hand, on a second input of the circuit 2 after a pass through a delay element 1 having a duration $\tau$ equal to $n$ instants of a clock H supplied by the receiving of the rhythm signal. The delay element 1 is, to great advantage, constituted by a shift register having n flip-flops ($n$ being variable), whose advance line receives the clock signal H. The output A of the comparison circuit 2 is applied to the input of a shift register 3 having $s$ bits ($s$ being invariable), deriving their rhythm from the same clock pulse H. The register 3 has $s$ parallel outputs which are applied to an AND gate 4 having $s$ inputs, whose output signal is designated by B. The means used for varying the length n of the shift register 1 will be described herebelow.

Figure 2A:
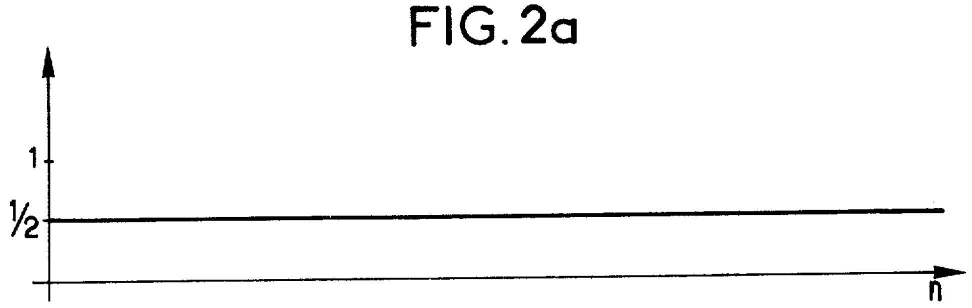

FIG. 2*a* shows the law of probability of the signal A where $n \neq$ N.

As the PCM signal has, approximately the same probability (P(1)=P(0)=0.5), where $n$ is different from N, the probability of having at A the valency of 1 or the valency of 0, is equal to 0.5: $P_A(1)=P_A(0)=0.5$ where $n \neq$ N.

Figure 2B:
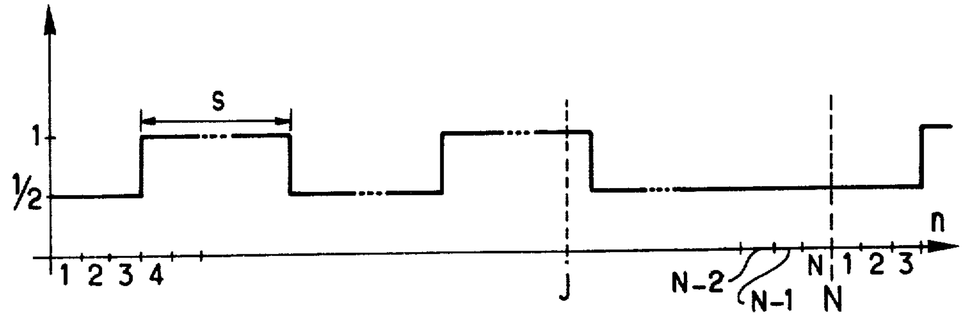

On the other hand, where $n$=N, for a repetitive word whose length is $s$, the probability $P_A(1)$ is equal to 1 at the instants corresponding to the pass of that word and equal to 0.5 in the other cases, as shown in FIG. 2*b*.

Figure 3A:
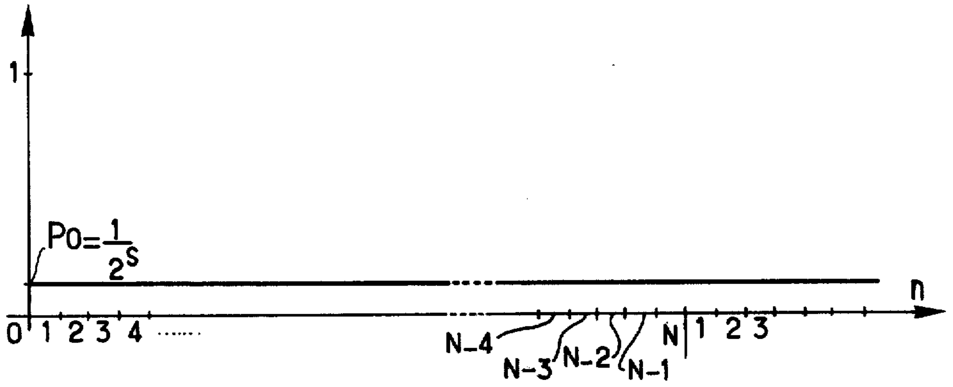
Figure 3B:
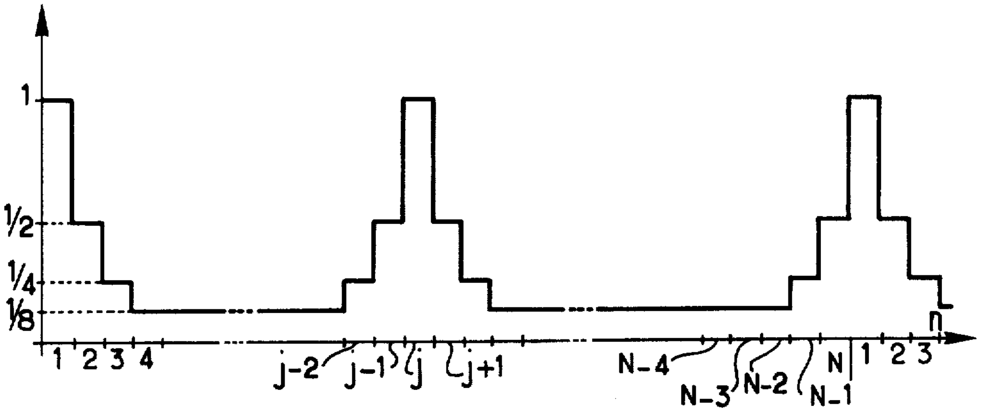

From these results, the laws of probability of the signal B are deduced. Where $n \neq$ N, the probability that each input of the AND gate 4 will be 1 or 0 is equal to ½. The probability $P_B(1)$ is therefore equal to $2^{-s}$, as shown in FIG. 3*a*.

Where $n$=N, the probability $P_B(1)$ is equal to 1 at the instants j where the synchronizing word, assumed to have a length s, is contained entirely in the register 3. It decreases in successive powers of 2 at the instants $j-1, j-2, \ldots j+1, j+2 \ldots$. FIG. 3*b* shows the situation where $s$=3.

The search for the value of N is based on the great difference which exists between these two laws of probability $P_B(1)$ where $n \neq$ N or $n$=N.

Figure 4:
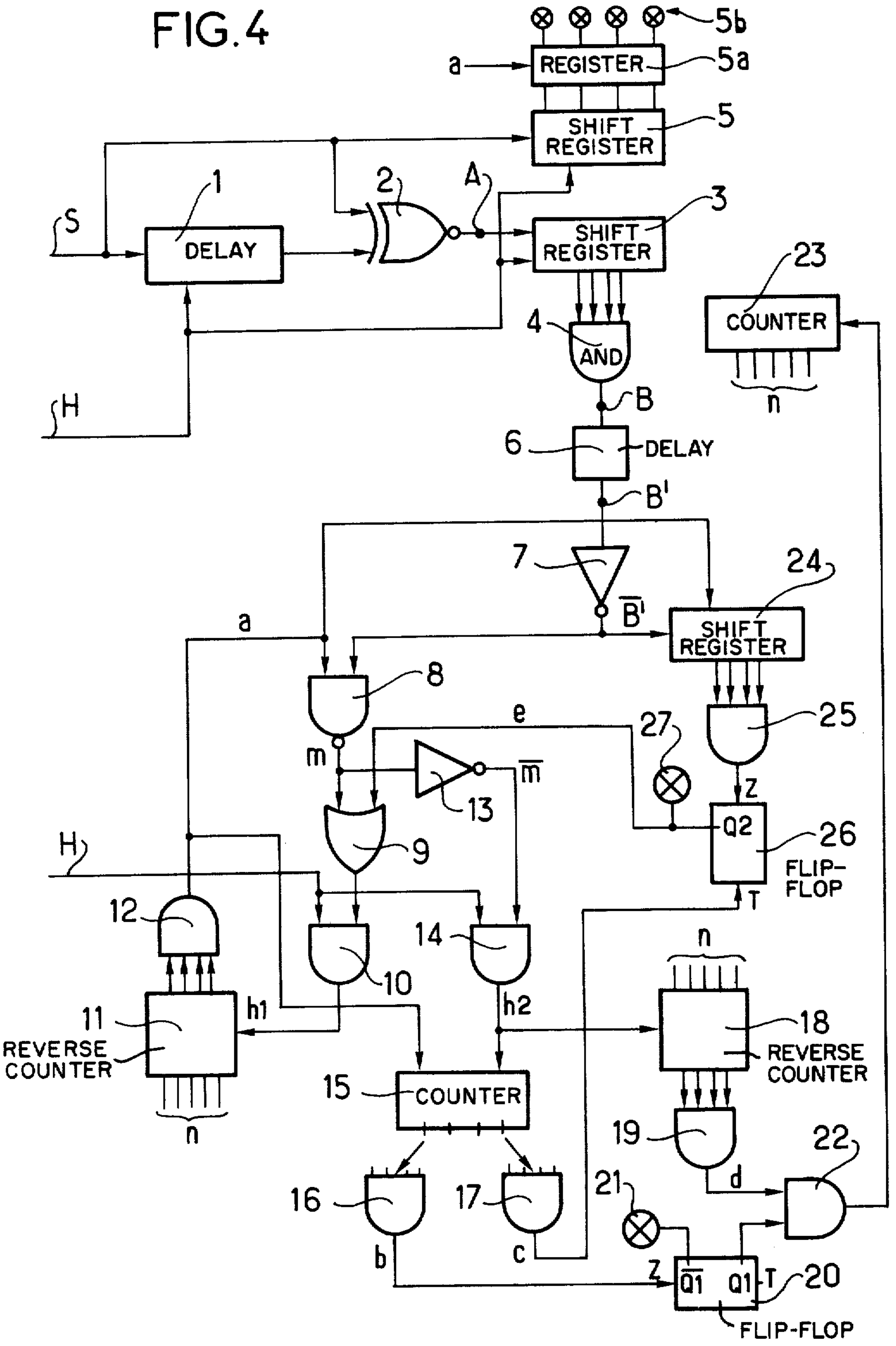
FIG. 4 is a diagram of the complete device.

In FIG. 4 the complete circuit of the device comprises, besides the elements 1, 2, 3, 4 (FIG. 1), the following elements. Reference numeral 5 is a shift register having a capacity of $s$ bits, which receives the direct signal S and derives its rhythm from the clock signal H. Reference numeral 5*b* is a battery of indicators for displaying the logic state of the flip-flops of the register 5, by means of a transfer element 5*a*.

The signal B leaving the coincidence gate 4 is slightly delayed, by a fraction of a clock instant, by a delay circuit 6, whose output signal B' reversed by an inverter 7, that is, $\overline{B}'$, is applied to an input of an $\overline{\text{AND}}$ gate 8. The signal leaving 8, namely, $m$ is applied through an OR circuit 9, to an input of an AND gate 10, another of whose inputs receives the signal H.

The output signal $h1$ of 10 is applied to a divider having a variable order, adjusted in relation to $n$, formed by a reverse counting counter 11 having a capacity of $n$ and by a decoder 12 for the zero state. The decoder 12 supplies, in response to the zero state of the reverse counting counter 11, a calibrated pulse, $a$, having a width equal to the interval between two clock pulses, which is applied to a second input of the AND gate 8.

The pulse a is also applied to a counter 15, having a noncritical capacity, for example 8, with which are combined two decoders: a first decoder 16 for decoding the state *p*1, with an output signal *b*, and a second decoder 17 for decoding the state *p*2, with an output signal *c*, where *p*2>*p*1. It could be assumed, for example, that *p*1=3, *p*2=6.

The counter 15 is reset to zero by a signal *h*2, coming from an AND gate 14, which receives on the one hand the clock signal H and on the other hand a signal $\overline{m}$, extracted from m (output of 8) by an inverter 13.

That same signal *h*2 is applied to a device formed by a reverse counting counter 18 preset to a position *n* and by a decoder 19 for the zero state which supplies, when the reverse counting counter 18 passes through zero, a calibrated pulse *d*.

The output of 16 (pulse *b*) is connected to an input Z (resetting to zero) of a bistable flip-flop 20 having as its outputs $Q_1$ and $\overline{Q}_1$. An indicator 21 is connected to the output $\overline{Q}_1$.

The flip-flop 20 also has an input T for resetting to 1, which is energized when the search is started up by a connection which is not shown.

The output of 19 (pulse *d*) is connected to an input of an AND gate 22, another of whose inputs is connected to the output $Q_1$ of the flip-flop 20. A main counter 23, which receives the output of the AND gate 22, displays a digital value *n*, and positions at that value n, by means of parallel connections shown by lines, the reverse counting counters 11 and 18. Originally, the counter 23 is positioned on an original value no by known means, not shown.

The signal $\overline{B}'$ leaving 7 is applied again to the input of a shift register 24 having a capacity of *q*, whose advance line derives its rhythm from the pulse a(output of 12). An AND gate 25 receives q parallel outputs of the shift register 24.

A bistable flip-flop 26 having an output $Q_2$ has an input Z for resetting to zero, connected to the output of 25 and an input T for resetting to 1, connected to the output of 17 (pulse *c*). The output $Q_2$ of the flip-flop 26 is connected on the one hand to an indicator 27, on the other hand, to the OR circuit 9 (connection *e*).

Figure 5:
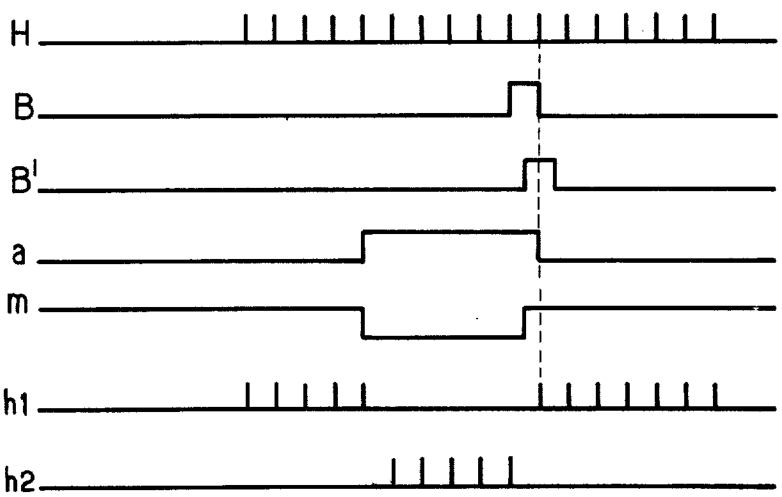
FIG. 5 is a set of seven graphs of logic signals which help to make it possible to understand the operation.

FIG. 5 contains seven graphs showing, in a particular case taken as an example, the form of the signals H, B, B', *a*, *m*, *h*1 and *h*2, respectively. The appearance of the last four will be explained in detail with reference to FIG. 4. The following observations will be made here:

1. The clock signal H is subdivided, in conditions which will be described, into a train *h*1 and a train *h*2, that is to say, that *h*1+*h*2=H.

2. The appearance of a signal a=1 (reverse counting counter 11 at zero) brings about the signal *m*=zero and maintains it until the appearance of a signal B'=1.

The main counter 23 imposes, on the divider having a variable order, the value *n*. The pass through the zero state applies a valency of *a*=1 to the gate 8. If, at that instant, B'=0, and $\overline{B}'$=1, there is a second 1 at 8; therefore, *m*=0. Consequently, the gate 10 is closed and the clock pulses h1 no longer reach the reverse counting counter 11. The latter therefore retains its zero state (*a*=1, FIG. 5) as long as B remains at zero. It is said that the remaining of the reverse counting counter 11 at the zero state by the canceling of a pulse *h*1 constitutes a shift.

At the same time, the pulses *h*2 reach the reverse counting counter 18 through the open gate 14 ($\overline{m}$=1).

If *n* ≠ N, in the general case, the divider having a variable order is blocked in the zero state during a certain random number of clock instants, namely α. Indeed, the probability of the state B=1 for n ≠ N is slight, in the order of ½s, but not zero. The reverse counting counter 18 will receive, at its clock input, trains of α1, α2 . . . α*j* pulses *h*2, separated by *n* clock instants *h*1. When 18 displays a zero, *n* shifts have been effected by totalizing the trains α; this is the proof that *n* ≠ N. In that case, a pulse *d* coming from 19 is transmitted by 22 (Q=1) to the main counter 23, which displays *n'*=*n*+1. Hence, there is a new search for correlation on the basis of a frame of (*n*+1) bits. The increase of *n*, unit by unit, takes place each time a pulse *d* appears.

Where n ≠ N, since there exists a slight probability, in the order of ½s, for a state B=1 to occur, a faulty detection of N must be avoided. For that purpose, the observing of the passing of a cetain number *p*1 of states B=1 separated exactly by *n* clock instants is imposed. It will be assumed, for example, that *p*1=3.

The pulses are counted by tthe counter 15, sensitive to the rising front, and reset to zero by each pulse *h*2.

Thus, at the passing of the third pulse α, arriving without any shift, (*p*1=3) the decoder 16 applies to the bistable flip-flop 20 a pulse *b* for resetting to zero; Q passes to zero and the gate 22 closes. Henceforth, the parameter *n* is considered equal to N and can no longer change. At the same time, the indicator 21 lights up, this indicating that N has been determined and *n*=N.

Nevertheless, the situation B=1 does not occur necessarily in the position *j* (see FIG. 3*b*). The probability $P_B(1)$ is again equal to ½ for *j*−1, *j*+1 and to ¼ for *j*−2, *j*+2. To decide whether the phase setting is correct, it is necessary to wait for *p*2 frames (decoder 17) to pass, where *p*2 is equal, for example, to 6. When that condition is fulfilled, the bistable flip-flop 26 is set to 1 by a pulse *c* reaching its terminal T. Therefore, Q2 applies a 1 through the line *e* to the OR circuit 9. All the clock pulses H reach the divider (11, 12) having a variable order.

The lighting up of the indicator 27 by Q2=1 confirms the existence of a repetitive word in the frame, as well as the value of N.

It may happen that after a correct phase shift supplying B'=2, the phase may be lost.

The shift register 24 is used for taking into account that possibility. If, on *q* consecutive frames, the signal B' arrives with a valency of 0, *q* valencies of 1 enter the register 24 behind the inverter 7. Therefore, the gate 25 applies to the flip-flop 26 an order for resetting to zero on the terminal Z. Shifts are again made possible, so as to find the lost phase again.

When the indicators 21 and 27 are lit up permanently, this shows that the value of *n* is equal to N. If the indicator 27 does not light up or lights up intermittently, this proves that the value of *n* is inexact and the complete search cycle must be started up again.

The extra shift register 5 having a capacity of *s* bits like the register 3, is used for memorizing the repetitive word at the instant of the pass through zero of the divider (11, 12) having a variable order. A transfer circuit 5*a*, tripped by the pulse *a*, displays on the indicators 5*b* the register configuration 5 at the instant of the pulse. That configuration should be interpreted only when the indicators 21 and 27 are lit up.

The repetitive word does not, in general, have a length of $s$ bits. Its length $k$ is unknown and the capacity $s$ of the registers 3 and 5 is invariable. According to the value of $s$ in relation to $k$, the probability curve of the signal B changes aspects.

These curves have been traced for $s=4$ by way of an example, in the case where $k>s$ (FIG. 6*a*), $k=s$ (FIG. 6*b*), $k<s$ (FIG. 6*c*). The three curves have, as their stage width, respectively, $k-s+1$, 1, $s-k+1$. Where $k<s$, the probability of detection of N is slight, as shown by the curve 6*c*. Where $k>s$, the probability of detection of N is equal to 1 (curve 6*a*).

It is an advantage to assume, for $s$, a value such that $k$ be greater than or equal to $s$ in the majority of cases.

FIG. 7 shows that where $k>s$, the register 5 does not contain the whole of the repetitive word. The indicators **5*b* will supply only the constitution of the part of that word formed by the first $s$ bits. If it is required to know the constitution of the complete word, forced shifts will be brought in by a manual control in the analysis of the correlation process, canceling a pulse from the train $h1$ reaching the divider (11, 12) having a variable order. That operation will be repeated until the indicator 27** is turned off.

For that purpose, a complement of equipment which is shown in FIG. 7, where the references common to FIG. 4 have the same meaning as in that figure, will be used.

That manual inserting of forced shifts by canceling pulses of the train $h1$ comprises two processes:

1. Inhibiting of the automatic control means for the shifts;

2. Manual tripping of the canceling of a pulse of the train $h1$. This latter operation will be repeated the number of times required.

An OR circuit 28 placed between the output Q2 of the flip-flop 26 and an input of the OR circuit 9 (see FIG. 4) enables a permanent valency of 1 supplied by the position 1 of a two-position switch 30 (0 position automatic; 1 position manual) to be applied to the AND gate 10.

An element 29 energized by a manual tripping operation (for example, by the action of a press-button 29') cancels a pulse of the train H. The canceling of a pulse from a pulse train by means of flip-flops is a well-known method in the electronic technique.

The phase of analysis of the signal B is therefore shifted each time by one bit. At each shift, an extra invariable bit appears on the indicators **5*b*. After $(k-s+1)$ shifts, the indicator 27** will be turned off.

The repetitive word on which the phase is set may be either the synchronizing word (one per frame), or a "free channel" word.

If there exists, at the instant of the analysis, more than one free channel, the synchronizing word corresponds to the fixed code the least frequently encountered.

FIG. 8 shows an arrangement making it possible to vary the length of the register 1 (FIG. 4) according to the ditigal value displayed by the counter 23.

The register 1 is constituted by elementary segments whose individual lengths are in binary series: $2^0 \ldots 2i$, $2^{i+1}$, etc.

The segment 31, whose length is $2^i$, is connected to the following segment 32 by a logic circuit comprising two AND gates, 33, 34, an inverter 35 and an OR circuit 36. If the stage $2^i$ of the counter 23 is tripped, a parallel output of that stage applies a 1 to the gate 34 and a zero to the gate 33. The segment 31 is inserted in series in the register. If the stage $2^i$ of the counter 23 is not tripped, the parallel output of that stage applies a zero to the gate 34 and a 1 to the gate 33. The segment 31 is short-circuited.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. Device for the automatic search for the characteristic data elements of a time multiplexing frame having an unknown number N of bits and at least one repetitive word comprising clock means providing clock signals at the frequency of the bits in said time multiplexing frame, a delay circuit having a variable delay of $n$ clock signals, a correlation circuit receiving directly at a first input successive bits of successive frames and at a second input said successive bits via said delay circuit, a detection circuit means for detecting $s$ successive coincidences between the successive bits and the delayed bits, and control means for varying the delay of said delay circuit until $s$ successive coincidences are detected for which the number N of bits in the frame is equal to the number $n$ of clock signals.

2. Device for the automatic search for the characteristic data elements of a time multiplexing frame having an unknown number of bits and at least one repetitive word comprising clock means providing clock signals at the frequency of the bits in said time multiplexing frame, correlation means operating in synchronism with said clock signals for comparing a first series of S bits in said frame with a second series of S bits positioned in said frame $n$ clock signals before said first series, and control means for changing the value of $n$ until a correlation is detected between said first and second series of S bits, wherein said correlation means comprises a delay element having an adjustable duration of $n$ clock signals, an EXCLUSIVE OR circuit having one input receiving said data elements directly and a second input receiving said data elements via said delay element, a shift register having a capacity of S bits connected to the output of said EXCLUSIVE OR circuit, and an AND gate having inputs connected to the output of each stage of said shift register.

3. Device as defined in claim 2 wherein said delay element comprises a second shift register having a plurality of stages and logic circuit means including a main counter responsive to the output of said control means for selectively short-circuiting stages of said second shift register to adjust the length thereof.

4. Device as defined in claim 3 wherein said control means includes a divider having a variable order $n$ receiving clock signals from said clock means and inhibit means for diverting application of said clock signals from said divider until an output is provided at said AND gate.

5. Device as defined in claim 4 wherein said control means further includes a reverse counter preset to the value $n$, connection means connected to said inhibit means for applying to said reverse counter the clock signals diverted from said divider, and gating means for advancing said main counter during each pass of said reverse counter through zero.

6. Device as defined in claim 5 wherein said control means further includes a counter connected to count the output of said divider and is connected to said connection means so as to be reset by said clock signals diverted from said divider, a first decoder connected to the output of said counter for decoding a first value, and a first flip-flop connected to the output of said first decoder for enabling said gating means upon receipt of an output from said first decoder.

7. Device as defined in claim 6 wherein said control means further includes a second decoder connected to the output of said counter for decoding a second value, and a second flip-flop responsive to the output of said second decoder for disabling said inhibit means to apply all clock signals to said divider.

8. Device as defined in claim 7 wherein said control means further includes a third shift register connected to the output of said divider and said AND gate, a second AND gate having inputs connected to the stages of said third shift register and an output connected to a second input of said second flip-flop.

9. Device as defined in claim 2, further including a fourth shift register having a capacity of S bits connected to receive said data elements, a plurality of indicators, and a transfer circuit connecting each stage of said fourth shift register to a respective indicator.

10. Device as defined in claim 4, further including means for overriding said inhibit means and manual means for selectively controlling, one by one, the clock signals applied to said divider.

* * * * *